US006990217B1

(12) United States Patent  (10) Patent No.: US 6,990,217 B1
Moghaddam et al.  (45) Date of Patent: Jan. 24, 2006

(54) GENDER CLASSIFICATION WITH SUPPORT VECTOR MACHINES

(75) Inventors: Baback Moghaddam, Cambridge, MA (US); Ming-Hsuan Yang, Urbana, IL (US)

(73) Assignee: Mitsubishi Electric Research Labs. Inc., Cambridge, MA (US)

( * ) Notice: Subject to any disclaimer, the term of this patent is extended or adjusted under 35 U.S.C. 154(b) by 612 days.

(21) Appl. No.: 09/444,689

(22) Filed: Nov. 22, 1999

(51) Int. Cl.
*G06K 9/00* (2006.01)

(52) U.S. Cl. ..................................... 382/118; 382/159
(58) Field of Classification Search ................ 382/118, 382/159, 224, 225
See application file for complete search history.

(56) References Cited

U.S. PATENT DOCUMENTS 5,710,833 A   1/1998  Moghaddam et al. ....... 382/228

OTHER PUBLICATIONS

Osuna et al. Training Support Vector Machines: An Application to Face Detection. IEEE Computer Society Conference on Computer Vision and Pattern Recognition. Jun., 1997. 130-136.*
Gutta et al. Gender Classification of Human Faces Using Hybrid Classifier Systems. IEEE International Conference on Neural Networks. Jun., 1997. vol. 3, 1353-1358.*
Brunelli et al.; "HyberBF Networks for Gender Classification"; In *Proceedings of the Image Understanding Workshop*, DARPA, San Diego, pp. 311-314, 1992.
Cottrell et al., "EMPATH: Face, Emotion and Gender Recognition Using Holons"; In *Advances in Neural Information Processing Systems*, pp. 564-571, 1993.
Edelman et al.; "Sex Classification of Face Areas: How Well Can A Linear Neural Network Predict Human Performance?"; Journal of Bilogical Systems, 6(3): 241-264, 1998.
Golomb et al., "Sexnet: A Neural Network Identifies Sex from Human Faces"; In *Advances in Neural Information Processing Systems* (NIPS), vol. 3, Lippmann et al. (Eds.), Morgan Kaufmann, 1990, pp. 572-577.
Gutta et al., "Gender and Ethnic Classification of Face Images"; In Proceedings of the IEEE International Automatic Face and Gesture Recognition, pp. 194-199, 1998.
Hill et al.; "Perceiving the Sex & Race of Faces: The Role of Shape and Colour"; Proc. R. Soc. Lond. B (1995) 261, pp. 367-373.
O'Toole et al.; "The Perception of Face Gender: The Role of Stimulus Structure in Recognition and Classification"; *Memory and Recognition*, vol. 25, 1997.
Sim et al.; "High-Performance Memory-based Face Recognition for Visitor Identification"; 1999.
Tamura et al.; "Male/Female Identification from 8x6 Very Low Resolution Face Images by Neural Network"; *Pattern Recognition* 29(2): pp. 331-335, 1996.
Wiskott et al.; "Face Recognition and Gender Determination"; *Proc. Intl. Workshop on Automatic Face and Gender Recognition*, pp. 92-97, 1995.

* cited by examiner

*Primary Examiner*—Jingge Wu
*Assistant Examiner*—Colin LaRose
(74) *Attorney, Agent, or Firm*—Dirk Brinkman; Andrew J. Curtin

(57) ABSTRACT

A method classifies images of faces according to gender. Training images of male and female faces are supplied to a vector support machine. A small number of support vectors are determined from the training images. The support vectors identify a hyperplane. After training, a test image is supplied to the support vector machine. The test image is classified according to the gender of the test image with respect to the hyperplane.

1 Claim, 2 Drawing Sheets

GENDER CLASSIFICATION WITH SUPPORT VECTOR MACHINES

FIELD OF THE INVENTION

The present invention deals with classifying facial images, and more particularly to classifying the facial images according to gender.

BACKGROUND OF THE INVENTION

Although humans are extremely good at classifying gender from facial images, experiments have shown that most people have difficulty in classify gender from images were the faces are hairless. Furthermore, error rates in gender classification using low resolution facial images increases almost ten fold.

It would represent a major commercial advantage if computers could have reliable vision capabilities for classifying a person's gender, particularly from low resolution images. Although gender classification has been investigated from both a psychological and computational perspective, relatively few learning based vision methods are known for gender classification.

Golomb et al. in "SEXNET: A neural network identifies sex from human faces," Advances in Neural Information Processing Systems, pp. 572–577, 1991, described a fully connected two-layer neural network to identify gender from human face images consisting of 30×30 pixel images.

Cottrell et al. in "Empath: Face, emotion, and gender recognition using holons," Advances in Neural Information Processing Systems, pp. 564–571, 1991 also applied neural networks for face emotion and gender recognition. They reduced the dimensionality of a set of 4096×4096 images to 40×40 via an auto-encoder network. Those vectors were then given as inputs to another one layer network for training and recognition.

Brunelli et al, in "HyperBF networks for gender classification," Proceedings of the DARPA Image Under-standing Workshop, pp. 311–314, 1992 developed HyperBF networks for gender classification in which two competing RBF networks, one for male and the other one for female, were trained using sixteen geometric features, e.g., pupil to eyebrow separation, eyebrow thickness, and nose width, as inputs.

Instead of using a raster scan vector of gray levels to represent face images, Wiskott et al. in "Face recognition and gender determination," Proceedings of the International Workshop on Automatic Face and Gesture Recognition, pp. 92–97, 1995 described a system that used labeled graphs of two-dimensional views to describe faces. The nodes were labeled with jets which are a special class of local templates computed on the basis of wavelet transform, and the edges were labeled with distance vectors. They used a small set of controlled model graphs of males and females to encode the general face knowledge.

More recently, Gutta et al. in "Gender and ethnic classification of Face Images," Proceedings of the IEEE International Automatic Face and Gesture Recognition, pp. 194–199, 1998 proposed a hybrid method which consists of ensemble of neural networks (RBFs) and inductive decision trees.

Using computer vision to determine the gender of subject faces can be used in various application areas, such as the gathering of population gender-statistics from patrons at entertainment/amusement/sports parks. Gender classification can also be used by television network viewer-rating studies. Gender specific computer vision can further have application in such fields as automated security/surveillance systems, demographic studies, safety monitoring systems, and human interfaces to computers.

SUMMARY OF THE INVENTION

It is an object of the present invention to classify gender from thumbnail facial images in which only the main facial regions appear, i.e., the images have minimal or no hair information. The motivation for using such images is as follows. Humans can easily and frequently change their hair styles, therefore, facial images cropped to keep only the main facial regions, without hair, will provide a more robust gender recognition method.

The method according to the invention masks images of faces such that as little hair as possible appears in the images. The images are reduced down to thumbnail images to minimize storage requirements. A support vector machine is applied to training images. After a classification discriminator has been trained, faces in test images can be classified.

More specifically, the invention provides a method for classifying images of faces according to gender. Training images of male and female faces are supplied to a vector support machine. A small number of support vectors are determined from the training images. The support vectors identify a hyperplane. After training, a test image is supplied to the support vector machine. The test image is classified according to the gender of the test image with respect to the hyperplane.

DETAILED DESCRIPTION OF THE PREFERRED EMBODIMENT

Figure 1:
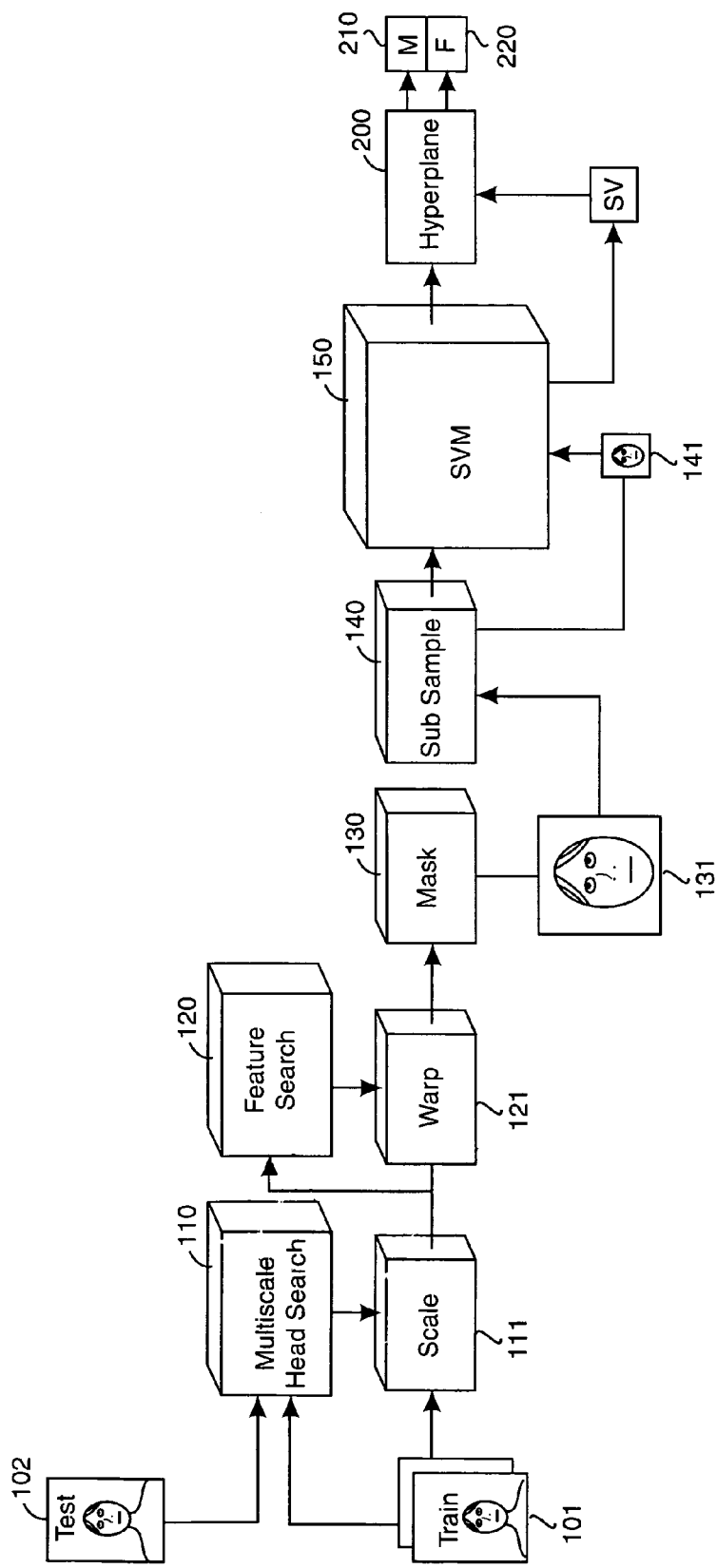
FIG. 1 is a flow diagram of a gender classification method according to the invention.

FIG. 1 shows a method 100 for gender classifying images of human faces according to our invention. Our method takes training facial images 101 as input. The training images can be pre-processed using an automatic face-processing system. The face-processing system normalizes the training images for translation, scale, and rotations. Step 110 performs a multiscale 111 maximum-likelihood estimation to detect faces in the training images.

Step 120 performs a facial feature search with affine warping 121 for geometric shape alignment, and contrast normalization for ambient lighting changes. Step 130 applies a mask to produce full resolution (80×40 pixels) faceprints 131. Masking removes most of the extraneous features present in the faceprints such as background, and particularly hair. Step 140 sub-samples the full resolution faceprints to obtain a low resolution (21×21 pixels) or "thumbnail" image 141. This part of the face processing system is described in greater detail in U.S. Pat. No. 5,710,833 issued to Moghaddam, et al. on Jan. 20, 1998, incorporated herein by reference.

Support Vector Machine

The thumbnail images are presented to a support vector machines (SVM) 150. SVMs are actually not machines but methods for pattern recognition, regression and other learning problems. SVMs have been known for decades. SVMs are primarily designed for two-class classification problems, see Vapnik et al. in "Pattern Recognition using Generalized Portrait," Automation and Remote Control, 24:6, 1963.

Figure 2:
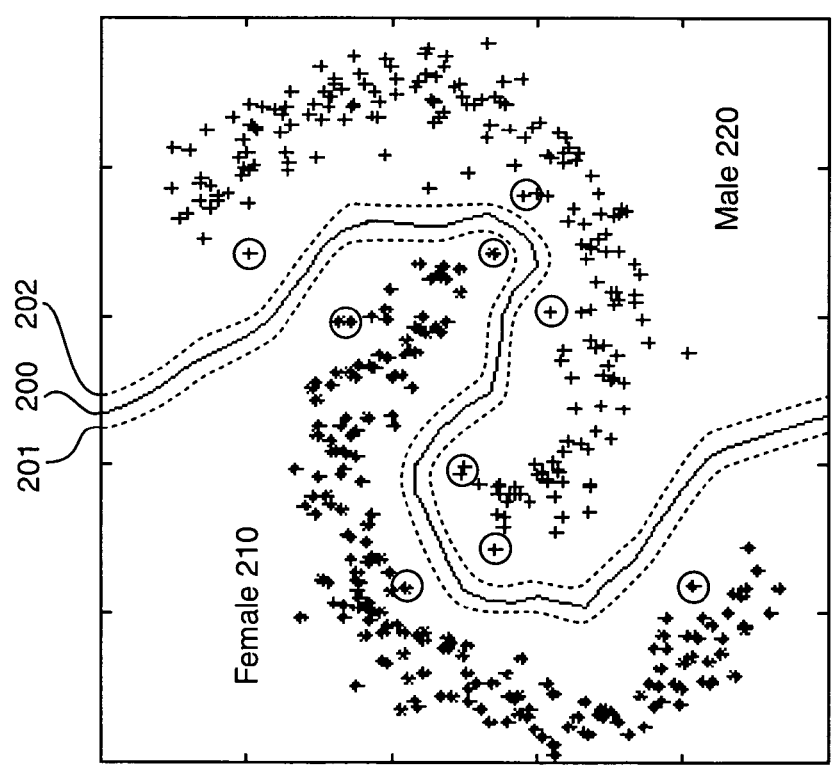
FIG. 2 is a diagrammatic of a support vector machine hyperplane.

As shown in FIG. 2, the SVM locates an optimal manifold or hyperplane 200 that leaves the largest possible fraction of data points of the same class (male 210 or female 220) on the same side of the hyperplane 200. FIG. 2 shows example data in two-dimensions for the purpose of illustrating the invention. It should be understood that the actual data can have much higher dimensions making the manifold 200 a hyperplane. The SVM 150 also maximizes the distance or "margins" 201–202 of either class from the hyperplane such that the expected recognition error for the actual samples to be classified is minimized. Maximizing the margins of the hyperplane is equivalent to minimizing the Vapnik-Chervonenkis (VC) dimension of the SVM while constructing the optimal hyperplane. According to the structural risk minimization inductive principle, a function that describes the training data well and belongs to a set of functions with lowest VC dimension will generalize well regardless of the dimensionality of the input space. The hyperplane 200 can be represented by a small number of support vectors 203, e.g., circled training samples 203. As a result the SVM provides a compact classifier.

Based on this principle, the SVM adopts a systematic approach to find a linear function that belongs to a set of functions with the lowest VC dimension. The SVM also provides non-linear function approximations by mapping the input vectors into a high dimensional feature space where the hyperplane 200 is constructed. Although there is no guarantee that a linear hyperplane will always exist in the high dimensional feature space, in practice it is possible to construct a linear SVM in a projected space. The following sections describe the vector support machine in greater detail.

Given a set of samples $(x_1, y_1), (x_2, y_2), \ldots, (x_l, y_l)$ where $x_i(x_i \in R^N)$ is the input vector of N dimension, i.e., the thumbnail images 141, and $y_i$ is its label ($y_i \in \{-1,1\}$) for the present recognition problem, the SVM 150 finds the hyperplane 200 as described above. The problem of finding the optimal hyperplane is a constrained optimization problem. We solve the problem by using quadratic techniques. The optimal hyperplane is in the form:

$$f(x) = \sum_{i=1}^{l} y_i \alpha_i \cdot k(x, x_i) + b$$

where a and b are constants, k(.,;) is a kernel function, and the sign of f(x) determines the label of x. Constructing the optimal hyperplane is equivalent to determining a nonzero $a_i$. Any vector $x_i$ that corresponds to the nonzero $a_i$ is a supported vector (SV) 203 of the optimal hyperplane 200. As stated above, the number of supported vectors for defining the hyperplane 200 is small, making the SVM a compact classifier.

For a linear SVM, the kernel function is the simple dot product of vectors in the N dimensional input space, while the kernel function in a nonlinear SVM projects the samples to an Euclidean feature space of higher dimensions M via a nonlinear mapping function ψ:

$$\psi: R^N \to F^M, M \gg N$$

and construct a hyperplane in F. We do this because it is more likely to find a linear function in the high dimensional feature space F.

Using the well known Mercer's theorem, the lengthy calculations for projecting samples into the high dimensional feature space can be significantly reduce by using a suitable function k such that $$k(x, x_i) = \psi(x) \cdot \psi(x_i)$$

where ψ is the nonlinear projection function. Several kernel functions, such as polynomial functions and radial basis functions, see below, are known to satisfy Mercer's theorem.

By using different kernel functions, the SVM can construct a variety of learning machines, some of which coincide with classical architectures.

However, this also results in a drawback since we need to find the "right" kernel function while using nonlinear SVMs.

Classification Techniques

Radial Basis Function Networks

A radial basis function network is a method for improved generalization to new data based on regularization theory, please see Poggio et al. in "Networks for approximation and learning," Proceedings of the IEEE, volume 78, pp. 1481–1497, 1990. One powerful network is the RBF with K Gaussian basis functions of the form:

$$f(x) = \sum_{i}^{K} \omega_i G(x) + b$$

$$= \sum_{i}^{K} \omega_i \frac{1}{(2\pi)^{N/2} \sigma_i^N} \exp\left(-\frac{\|x - c_i\|^2}{2\sigma_i^2}\right) + b$$

where the G is the ith Gaussian basis function with center $c_i$ and variance $\sigma^2$. The weight coefficients $w_i$ combines the basis functions into a single output value and b is a bias term.

Training a Gaussian RBF network for a given learning task involves determining the total number of Gaussian basis functions, locating the Gaussian basis function centers, computing the cluster variance for each basis function, and solving for the weight coefficients and bias. With careful design on K, $c_i$, and $a_i$, Gaussian RBF networks are very powerful in many recognition problems.

In a conventional RBF network, the number of neurons is predetermined before training. On the other hand, the number of Gaussian basis for a large ensemble-RBF network is iteratively increased until the mean square error is below a threshold. The centers of the Gaussian basis for both networks are determined by k-means clustering.

In contrast, SVM with RBF kernel automatically determines the number and locations of the Gaussian centers, weights and threshold that minimize an upper bound on the expected test error.

Fisher Linear Discriminant

Fisher Linear Discriminant (FLD) is an example of a class specific method that finds the optimal projection for gender classification. Rather than finding a projection that maximizes the projected variance, FLD determines a projection, $y = W^T_{FLD} x$, that maximizes the ratio between the between-class (variance) and the within-class scatter (variance). Consequently, classification is simplified in the projected space.

Consider a c-class problem where the between-class scatter matrix is defined as:

$$S_B = \sum_{i=1}^{c} N_i(\mu_i - \mu)(\mu_i - \mu)^T$$

and the within-class scatter matrix be defined as:

$$S_W = \sum_{i=1}^{c} \sum_{x_k \in X_i} (x_k - \mu_i)(x_k - \mu_i)^T$$

where $\mu$ is the mean of all samples, $\mu_i$ is the mean of class $X_i$, and $N_i$ is the number of samples in class $X_i$. We chose an optimal projection $W_{FLD}$ as the matrix with orthonormal columns which maximizes the ratio of the determinant of the between-class scatter matrix of the projected samples to the determinant of the within-class scatter matrix of the projected samples, i.e., $$W_{FLD} = \underset{w}{\operatorname{argmax}} \frac{|W'S_B W|}{|W^T S_W W|} = [\omega_1 \omega_2 \ldots \omega_m]$$

where $\{\omega_i | i=1, 2, \ldots, m\}$ is the set of generalized eigenvectors of $S_B$ and $S_W$, corresponding to the m largest generalized eigenvalues $\{\lambda_i | i=1, 2, \ldots, m\}$. However, the rank of $S_B$ is c−1 or less. Thus, the upper bound on m is $c_1$. To avoid the singularity problem of SW, we apply principal component analysis (PCA) to first reduce the dimension of the feature space to $N_c$, and then apply the standard FLD to reduce the dimension to N−C, and then we apply the standard FLD to reduce the dimensions of c−1.

We use a Gaussian to model the distribution of projected samples of each male and female class in c−1 dimensional space. We then determine the class label of a sample on the Mahalanobis distances to the centers of these two classes. The Mahalanobis distance is a very useful way of determining the "similarity" of a set of values from an "unknown" sample to a set of values measured from a collection of "known" samples. We use the Mahalanobis distance method because it is very sensitive to inter-variable changes in the training data. In addition, because the Mahalanobis distance is measured in terms of standard deviations from the mean of the training samples, the reported matching values give a statistical measure of how well the unknown sample matches (or does not match) the original training data.

Linear and Quadratic Classifiers

If x is a sample in our two gender class problem, then the decision boundary of a quadratic classifiers is given by a quadratic form in x using the Bayes decision rule for minimum error. If the distribution of each class is a Gaussian, then the decision rule for a quadratic classifier is:

$$f(x) = \frac{1}{2}(x - \mu_1)^T \sum_{1}^{-1} (x - \mu_1) -$$

-continued $$= \frac{1}{2}(x - \mu_2)^T \sum_{2}^{-1}(x - \mu_2) + \frac{1}{2} \ln \frac{\left|\sum_1\right|}{\left|\sum_2\right|}$$

where $\mu_i$ and $\Sigma_i$(i=1,2) are the mean and covariance matrix in a Gaussian distribution, respectively.

A linear classifier finds a linear discriminator with the assumption that $\Sigma_1 = \Sigma_2 = \Sigma$, which simplifies the above equation into:

$$f(x) = (\mu_2 - \mu_1) \sum^{-1} x + \frac{1}{2}\left(\mu_1^T \sum^{-1} \mu_1 - \mu_2^T \sum^{-1} \mu_2\right)$$

For both classifiers, the sign of f(x) determines the class to which the sample x belongs. e.g., positive female, and negative male.

Experimental Results

In order to determine the effectiveness of the present invention, we trained with 1496 images, and tested with 259 images. We used high and low resolution images, 80×40 and 21×12 pixels, respectively. Each image was represented by a raster scan eight-bit vector. With the RBF kernel, the overall error rate for classifying low resolution thumbnail images was about 3.4%. This is significantly better than error rates obtained with prior art gender classifiers. We have also applied our classifier to high resolution images. It is worth noting that our method works equally well in both low and high resolution images with only 1% error rate difference. This demonstrates a degree of robustness and relative scale invariance of our method.

Table A below compares error rate percentages of prior art classifiers with the SVM classifiers (bold) of the present invention. The error rates percentages are for overall results, and male and female error rates in rank order.

TABLE A

| Classifier | Overall | Male | Female |
|---|---|---|---|
| SVM with RBF kernel | 3.38 | 2.05 | 4.79 |
| SVM with cubic polynomial kernel | 4.88 | 4.21 | 5.59 |
| Large ensemble of RBF | 5.54 | 4.59 | 6.55 |
| Classical RBF | 7.79 | 6.89 | 8.75 |
| Quadratic classifier | 10.63 | 9.44 | 11.88 |
| Fisher linear discriminant | 13.03 | 9.44 | 13.78 |
| Nearest neighbor | 27.16 | 26.53 | 28.04 |
| Linear classifier | 58.95 | 58.47 | 59.45 |

In order to calibrate the performance of our classifiers, we used human subject to classify the high and low resolution images. All subjects were asked to classify the gender from the face images, presented in random order, as best as they can without time constraints. For high resolution images, the overall error was about 6.5%, and for low resolution images the error rate was about 30%. These experiments clearly show that our method performs significantly better than humans in both high resolution and low resolution gender classification. It is not surprising that human subjects perform far better with high resolution images than with low resolution images. Surprisingly, our method perform almost equally well in both cases.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for classifying images of faces according to gender, comprising the steps of:

supplying a vector support machine with a plurality of training images, the training images including images of male and female faces;

determining a plurality of support vectors from the training images for identifying a hyperplane;

supplying the support vector machine with a test image;

classifying the gender of the test image with respect to the hyperplane; and reducing the resolution of the training images and the test image by sub-sampling before supplying the images to the support vector machine;

wherein the test image contains less than 260 pixels.

* * * * *